United States Patent [19]

Sogah

[11] Patent Number: 4,957,973

[45] Date of Patent: Sep. 18, 1990

[54] UNCATALYZED PROCESS FOR PREPARING "LIVING" POLYMERS

[75] Inventor: Dotsevi Y. Sogah, Wilmington, Del.

[73] Assignee: E. I. Du Pont de Nemours and Company, Wilmington, Del.

[21] Appl. No.: 99,745

[22] Filed: Sep. 22, 1987

Related U.S. Application Data

[63] Continuation-in-part of Ser. No. 883,320, Jul. 8, 1986, abandoned.

[51] Int. Cl.$^5$ .................... C08F 293/00; C08F 30/08
[52] U.S. Cl. .................... 525/280; 525/282; 525/302; 526/294
[58] Field of Search .......... 526/73, 190, 294; 525/280, 282

[56] References Cited

U.S. PATENT DOCUMENTS

| | | | |
|---|---|---|---|
| 2,921,932 | 1/1960 | Erbaugh et al. | 526/73 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,668,746 | 5/1987 | Delaney et al. | 526/180 |
| 4,681,918 | 7/1987 | Webster | 525/282 |

OTHER PUBLICATIONS

Webster et al., *J. Ameri. Chem. Soc.*, 105, 5706 (1983).

*Primary Examiner*—Joseph L. Schofer
*Assistant Examiner*—Peter F. Kulkosky

[57] ABSTRACT

"Living" polymers and their preparation in the absence of a co-catalyst at a pressure greater than about 50 MPa, from polar acrylic or maleimide monomers and organo-silicon, -tin or -germanium initiators.

18 Claims, No Drawings

UNCATALYZED PROCESS FOR PREPARING "LIVING" POLYMERS

CROSS REFERENCE TO RELATED APPLICATION

This is a continuation-in-part of application Ser. No. 883,320 filed July 8, 1986 now abandoned.

BACKGROUND OF THE INVENTION

1. Field of the Invention

This invention relates to a process for polymerizing polar acrylic or maleimide monomers and to "living" polymers produced by such a process.

2. Background

U.S. Pat. Nos. 4,414,372; 4,417,034; 4,508,880; 4,524,196; 4,581,428; 4,588,795; 4,605,716; 4,622,372; 4,656,233; and 4,681,918, and commonly assigned U.S. patent application Ser. Nos. 660,588 filed Oct. 18, 1984 now U.S. Pat. No. 4,711,942; 912,117 and 912,118 filed Sept. 29, 1986 now U.S. Pat. No. 4,732,955; 934,826 filed Nov. 25, 1986 now U.S. Pat. No. 4,783,500; 004,831 filed Jan. 13, 1987 now U.S. Pat. No. 4,822,859; 007,758 filed Jan. 27, 1987 now U.S. Pat. No. 4,806,605; 015,727 filed Feb. 27, 1987 now U.S. Pat. No. 4,736,003; and 048,958 filed May 19, 1987 now abandoned, referred to hereinafter as "the aforesaid patents and patent applications", disclose processes for polymerizing a polar acrylic or maleimide monomer to a "living" polymer in the presence of an initiator, which is a tetracoordinate organosilicon, organotin or organogermanium compound having at least one initiating site, and a cocatalyst which is a source of fluoride, cyanide or azide ions or a suitable Lewis acid, Lewis base or selected oxyanion. Such polymerization processes have become known in the art as Group Transfer Polymerization (Webster et al., *J. Amer. Chem. Soc.*, 105, 5706 (1983)). The aforesaid patents and patent applications disclose that preferred monomers for use in Group Transfer Polymerization are selected from acrylic and maleimide monomers of the formula $CH_2=C(Y)X$ and

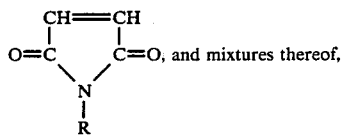

and mixtures thereof, wherein:

X is $-CN$, $-CH=CHC(O)X'$ or $-C(O)X'$;
Y is $-H$, $-CH_3$, $-CN$ or $-CO_2R$, provided, however, when X is $-CH=CHC(O)X'$, Y is $-H$ or $-CH_3$;
X' is $-OSi(R^1)_3$, $-R$, $-OR$ or $-NR'R''$;
each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;
R is:
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; and
(e) a radical of (a), (b), (c) or (d) containing one or more reactive substituents of the formula $-Z'(O)-C-C(Y^1)=CH_2$ wherein $Y^1$ is $-H$ or $-CH_3$ and $Z'$ is O or $NR'$; and
each of R' and R" is independently selected from $C_{1-4}$ alkyl.

Preferred initiators are selected from tetracoordinate organsilicon, organotin and organogermanium compounds of the formulas $(Q')_3MZ$, $(Q')_2M(Z^1)_2$, and $[Z^1(Q')_2M]_2O$ wherein:
each Q', independently, is selected from $R^1$, $OR^1$, $SR^1$ and $N(R^1)_2$;
$R^1$ is as defined above for the monomer;
Z is an activating substituent selected from the group consisting of

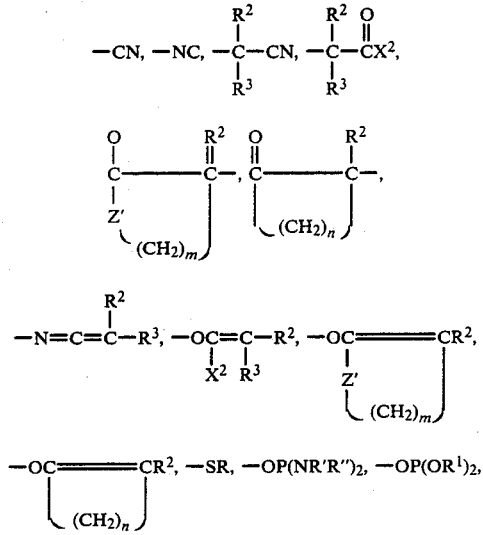

$-OP[OSi(R^1)_3]_2$ and mixtures thereof;
R', R", and R are as defined above for the monomer;
$X^2$ is $-OSi(R^1)_3$, $-R^6$, $-OR^6$ or $-NR'R''$;
$R^6$ is
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites;
each of $R^2$ and $R^3$ is independently selected from $-H$ and hydrocarbyl, defined as for $R^6$ above, subparagraphs (a) to (e);
each of R' and R" is independently selected from $C_{1-4}$ alkyl;
Z' is as defined above for the monomer;
m is 2, 3 or 4;
n is 3, 4 or 5;
$Z^2$ is

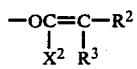

wherein $X^2$, $R^2$ and $R^3$ are as defined above;

at least one of any R, $R^2$ and $R^3$ in the initiator contains one or more initiating substituents of the formula —$Z^2$—$M(R^1)_3$ wherein $R^1$ is as defined above and M is as defined below;

$Z^2$ is a diradical selected from the group

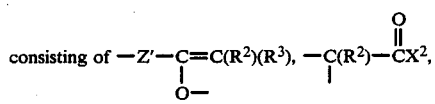

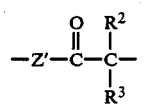

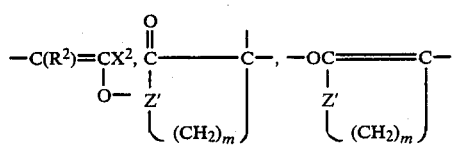

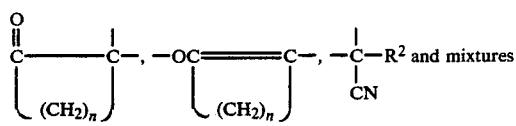

thereof, wherein $R^2$, $R^3$, $X^2$, Z', m and n are as defined above;

$R^2$ and $R^3$ taken together are

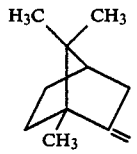

provided, however, Z is

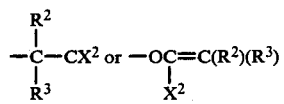

and/or $Z^2$ is 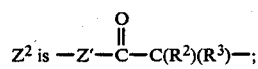;

$X^2$ and either $R^2$ or $R^3$ taken together are

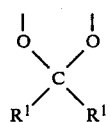

-continued provided, however, Z is 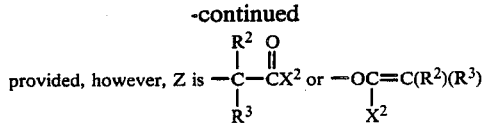

and/or $Z^2$ is 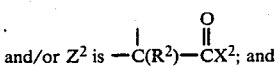; and

M is Si, Sn, or Ge, provided, however, when Z is

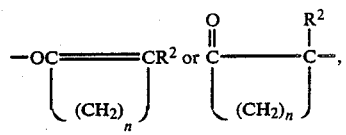

M is Sn or Ge, and provided, however, when $Z^2$ is

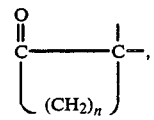

M is Sn or Ge.

In the aforesaid patents and patent applications, preferred co-catalysts are selected from a source of bifluoride ions $HF_2^-$, or a source of fluoride, cyanide or azide ions, or a source of oxyanions, said oxyanions being capable of forming a conjugate acid having a pKa (DMSO) of about 5 to about 24, preferably about 6 to about 21, more preferably 8 to 18, or a suitable Lewis acid, for example, zinc chloride, bromide or iodide, boron trifluoride, an alkylaluminum oxide or an alkylaluminum chloride, or a suitable Lewis base, for example, a Lewis base of the formula selected from $(R^4)_3M'$ and

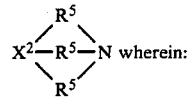 wherein:

M' is P or As;

$X^1$ is —N— or —CH, provided, however, when the monomer is a nitrile, $X^1$ is —CH;

each $R^4$, independently, is:

(a) a $C_{1-12}$ alkyl, $C_{4-12}$ cycloalkyl, $C_{6-12}$ aralkyl or di($C_{1-4}$ alkyl)amino group;

(b) a group of (a) wherein two or three of the alkyl, cycloalkyl and/or aralkyl groups are joined together by means of one or more carbon-carbon bonds;

(c) a group of (a) or (b) wherein the alkyl, cycloalkyl and/or aralkyl groups contain within aliphatic segments thereof one or more hetero atoms selected from O, N and S; or (d) a group of (a), (b) or (c) wherein the alkyl, cycloalkyl and/or aralkyl groups contain one or more substituents that are unreactive under polymerizing conditions; and each $R^5$ is —$CH_2CH_2$— or —$CH_2CH_2$— containing one or more alkyl or other substituents that are unreactive under polymerizing conditions.

U.S. Pat. Nos. 4,659,782 and 4,659,783 and commonly assigned U.S. patent application Ser. Nos. 627,919 filed July 5, 1984 now abandoned; and 771,684, now U.S. Pat. No. 4,695,607; 771,685, now abandoned and 771,686 now abandoned, filed on Sept. 3, 1986, also referred to hereinafter as "the aforesaid patents and patent applications", disclose acrylic star polymers prepared by Group Transfer Polymerization.

Additional details regarding Group Transfer Polymerization can be obtained from the aforesaid patents and patent applications, the disclosures of which are hereby incorporated herein by reference.

It has been found that the presence of a co-catalyst in Group Transfer Polymerization produces "living" polymers with silyl end groups which are extremely sensitive to atmospheric moisture. For this reason, "living" polymers are handled in a dry atmosphere. For some applications, the co-catalyst must be separated from the "living" polymer by means of a difficult purification process. These disadvantages are circumvented in the uncatalyzed polymerization process of the present invention. The process provides a more hydrolytically stable system and allows for simplified purification of "living" polymer product.

SUMMARY OF THE INVENTION

The present invention provides a polymerization process for preparing a "living" polymer, the process comprising contacting at least one polar acrylic or maleimide monomer with a tetracoordinate organosilicon, organotin or organogermanium polymerization initiator having at least one initiating site, said process being conducted in the absence of a co-catalyst and at a pressure greater than about about 50 MPa. The present invention also provides "living" polymer prepared by the specified process. The monomers and initiators which are operable in the process of the invention are the same as those disclosed in the aforesaid patents and patent applications.

DETAILED DESCRIPTION OF THE INVENTION

More specifically, the invention resides in a polymerization process conducted in the absence of a co-catalyst and at a pressure greater than about 50 MPa. The process produces a "living" polymer that is less sensitive to atmospheric moisture than polymer produced by Group Transfer Polymerization which requires a co-catalyst. Some of the polymers produced by the present process are highly syndiotactic, particularly polymers prepared from methacrylic monomers. This stereochemical control is attained without use of very low polymerization temperatures or special catalysts.

In the present process, preferred monomers are polar acrylic monomers of the formula $CH_2=C(Y)X$ wherein X and Y are defined as above; preferred forms of X and Y are those described in the aforesaid patents and patent applications. In most preferred forms of X and Y, R is a radical containing one or more reactive substituents of the formula $-Z'(O)C-C(Y^1)=CH_2$ wherein $Y^1$ is $-H$ or $-CH_3$, $Z'$ is O or $NR'$, and $R'$ is selected from $C_{1-4}$ alkyl.

In the present process, suitable initiators are tetracoordinate organosilicon, organotin or organogermanium polymerization initiators having at least one initiating site, as described in the aforesaid patents and patent applications. By "initiating site" is meant a group comprising the metal-containing moiety $-M(Q')_3$ or $>M(Q')_2$, wherein M and $Q'$ are as defined below, derived from a Group Transfer Polymerization initiator. Preferred initiators for use in the present process are selected from tetracoordinate organsilicon, organotin and organogermanium compounds of the formulas $(Q')_3MZ^1$, $(Q')_2M(Z^1)_2$, $[Z^1(Q')_2M]_2O$ and $(Q')_3MZ^2$ wherein:

each $Q'$, independently, is selected from $R^1$, $OR^1$, $SR$ and $N(R^1)_2$;

M is Si Sn or Ge;

$Z^1$ is

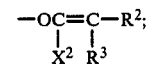

$Z^2$ is $-CN$ or $-NC$;

$X^2$ is $-OSi(R^1)_3$, $-R^6$, $-OR^6$ or $-NR'R''$;

$R^6$ is (a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more initiating sites;

each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;

each of $R^2$ and $R^3$ is independently selected from $-H$ and hydrocarbyl, defined as for $R^6$ above, subparagraphs (a) to (e);

each of $R'$ and $R''$ is independently selected from $C_{1-4}$ alkyl. Preferably, M is Si; $X^2$ (in $Z^1$) is $-OR^6$ and $R^6$ is $-CH_3$; $R^1$ is $-CH_3$ or $-C_2H_5$; and $R^2$ and $R^3$ (in $Z^1$) are, independently, $-H$ or $-CH_3$. A partial list of preferred initiators includes [(1-methoxy-2-methyl-1-propenyl)oxy]trimethylsilane; [(2-methyl-1-propenylidene)bis(oxy)bis[trimethylsilane]; and [(2-methyl-1-[2-(trimethylsiloxy)ethoxy]-1-propenyl)oxy]-trimethylsilane.

The process produces "living" polymer having repeat units of the monomers. By "living" polymer is meant a polymer of the invention which contains at least one terminal initiating site and is capable of polymerizing further in the presence of monomer(s) and co-catalyst or, in accordance with the present invention, in the absence of a co-catalyst and at a pressure greater than about about 50 MPa.

The process of the invention is conducted at a pressure greater than about 50 MPa. The upper limit of pressure is limited only by the structural integrity of the reactor in which the process is conducted. The process can be conducted in a variety of reactors that are well known in the art. Preferably, the process is conducted in a stainless steel reactor, a glass lined reactor or sealed platinum or gold tubes, and most preferably, in a sealed platinum or gold tube to minimize contamination. Inert gases are used to pressurize a selected reactor to the desired pressure. A partial list of suitable inert gases includes nitrogen, helium, argon. Preferably, the process is conducted at a pressure of from about 100 MPa to about 500 MPa, and most preferably, from about 250

MPa to about 350 MPa. Preferably, the process is conducted at a temperature from about 25° C. to about 110° C., and most preferably, from about 50° C. to about 100° C.

A solvent is desirable but not essential. Suitable solvents are aprotic liquids in which the monomer and initiator are sufficiently soluble for reaction to occur; that is, the materials are dissolved at the concentrations employed. Suitable solvents include ethyl acetate, propionitrile, toluene, xylene, bromobenzene, dimethoxyethane, diethoxyethane, diethylether, tetramethylene sulfone, N,N-dimethylformamide, N,N-dimethylacetamide, N-methylpyrrolidone, anisole, 2-butoxyethoxytrimethylsilane, cellosolve acetate, acetonitrile, and tetrahydrofuran. Acetonitrile, dichloromethane and tetrahydrofuran are preferred solvents. The monomers used in the process of the invention are generally liquids and can be polymerized without a solvent, although a solvent is beneficial in controlling temperature during exothermic polymerization. When a solvent is used, the monomer may be dissolved or dispersed therein at concentrations of at least 1 weight percent, preferably at least 20 weight percent. The initiator is employed at a concentration such that the monomer/initiator molar ratio is greater than 1, preferably greater than 5.

The "living" polymers produced by the process of the invention consist essentially of three or more repeat units of at least one polar acrylate and/or maleimide monomer and contain one or more initiating sites and residues of the initiators used in their preparation. The "living" polymer of the invention can be a homo- or copolymer, linear, branched, star-branched or block.

Solutions or dispersions of the "living" polymers of the present invention in aprotic solvents are useful for casting films or fibers or may be formulated into specialty coating compositions for a variety of substrates. The "living" polymers may also be capped or quenched as described for "living" polymers prepared by Group Transfer Polymerization, as disclosed in the aforesaid patents and patent applications, and the capped or quenched products may be molded into shaped articles, including films and fibers. Polymers containing functional substituents introduced via monomer, initiator and/or capping agent can be post-reacted to provide cross-linked structures, block copolymers and the like.

A partial list of preferred monomers includes methyl methacrylate; glycidyl methacrylate; sorbyl methacrylate; ethyl acrylate; butyl acrylate; sorbyl acrylate; 2-(trimethylsiloxy)ethyl methacrylate; 2-methacryloxyethyl acrylate; 2-acetoxyethyl methacrylate; 2-(dimethylamino)ethyl methacrylate; N-phenyl-N-methylacrylamide; p-xylylene diacrylate; 1,4-bis(2-acryloxyethyl)benzene; pentaerythritol triacrylate; 1,1,1-trimethylolpropane triacrylate; pentaerythritol tetraacrylate; triethylene glycol diacrylate; triethylene glycol dimethacrylate; 1,1,1-trimethylolpropane trimethacrylate; 4-acryloxydiphenylmethane; and hexamethylenediol diacrylate and dimethacrylate. Ethyl acrylate is most preferred.

Examples of initiators which can initiate more than one polymer chain include trimethyl a,a'a"-tris(trimethylsilyl)-1,3,5-benzenetriacetate, dimethyl a,a'-bis(-trimethylsilyl)-1,3-benzenediacetate, 1,6-dimethoxy-1,5-hexadiene-1,6-diylbis(oxy)bis[trimethylsilane], and bis[(1-methoxy-2-methyl-1-propenyl)oxy]methylsilane.

The "living" polymers of the invention will remain "living" for substantial periods provided they are protected from active hydrogen sources such as water or alcohols. Solutions of "living" polymers in inert solvents, such as hydrocarbons, are especially useful for preserving and conveying the "living" polymers. Films and fibers may be cast or spun from such solutions, or the polymer may be isolated from solution and further processed, for example, pelletized or granulated. The final (non-living) polymeric product obtained by means of the process of the invention is formed by exposing the "living" polymer to an active hydrogen source, such as moisture or an alcohol, for example, methanol.

The process of the invention is useful for preparing homopolymers or copolymers of the monomers described above. In either case, the polymers obtained are "living" polymers which may be of high or low molecular weight and having a broad or narrow molecular weight distribution ($M_w/M_n$). At a given temperature, $M_w/M_n$ is primarily a function of the relative rates of initiation and polymerization. Rate of initiation, $r_i$, depends on initiator and monomer type and their relative concentrations. Polymerization rate, $r_p$, is a function of monomer reactivity and concentration. For monodispersity, $r_i/r_p$ is equal to or greater than 1, that is, the initiation rate is at least as fast as the polymerization rate and all chains grow simultaneously. Such conditions characterize the preparation of "living" polymers by anionic polymerization techniques of the art wherein $M_w/M_n$ ratios only slightly above the theoretical limit of 1 are obtainable; for example, poly(methyl methacrylate) of $M_w/M_n$ of about 1.01 to 1.1 are known in the art, as are copolymers of methyl methacrylate and other alkyl methacrylates. Control of $M_w/M_n$ permits useful variation in polymer physical properties, such as glass transition temperature, hardness, heat distortion temperature, and melt viscosity.

In the following examples of specific embodiments of this invention, parts and percentages are by weight and temperatures are in degrees Celsius unless otherwise specified. The polydispersity (D) of the polymer products of the examples is defined by $D = M_w/M_n$, the molecular weights being determined by gel permeation chromatography (GPC). Unless otherwise specified, the "living" polymer products obtained in the invention process were quenched by exposure to moist air before molecular weights were determined. Examples 3–28 and Comparative Experiments 3–28 were conducted in platinum tubes according to the following general procedure.

General Procedure for Reactions in Platinum Tubes

The platinum tubing used in these examples had an outside diameter of ⅜ and ½ inch (0.9 and 1.2 cm) with a wall thickness of 0.01 inch (0.2 cm). The maximum length of tubing used for the high pressure runs was 6.5 inches (16.5 cm). The desired length of tubing was calculated and cut. When calculating the length, an extra 3 inches (7.2 cm) were added to the length required for the volume of material contained. The extra 3 inches (7.2 cm) were used as follows: ½ inch (1.2 cm) bottom seal and crimp, 1.5 inches (3.8 cm) air space, 1 inch (2.5 cm) top seal and crimp. The extra length prevented part of the sample from getting overheated during the process of sealing the tubes. The tube was washed with a brush in soapy water and rinsed with distilled water, acetone and methylene chloride. It was then annealed on a fire-proof block by heating the metal to red hot but not so hot as to melt the platinum. The bottom of the tube was sealed by crimping ½ inch (1.2 cm) with a flat-nosed pliers. A small amount was cut off with scissors to bring the two edges in intimate contact. The oxygen torch was pointed directly at one corner until the metal began to glow at which point the torch was moved along the seal. The seal was then checked closely with a magnifier for smoothness and presence of pinpoints or holes. The tube was then heated once again under an atmosphere of argon gas to remove any moisture.

The monomer used in these examples was purified by passage through an alumina column under argon. Solvents and initiators were distilled prior to use. Reagents were added to the tube with syringes under an atmosphere of argon gas. The tube was crimped 1 inch (2.5 cm) from the top using a vise and torque wrench [for $\frac{3}{8}$ inch (0.9 cm) tubing a torque of 15 foot-pounds (2.08 M-Kg) was used, for $\frac{1}{2}$ inch (1.2 cm) tubing a torque of 29 foot-pounds (4.02 M-Kg) was used]. The tube was flattened with flat-nosed pliers above the crimp and a small portion of the metal was cut off with scissors to bring the two edges in intimate contact. The tube was placed in an ice bath such that the flat portion of the tube was above the ice and sealed as described earlier, labeled and weighed.

The tubes were placed in a stainless steel vessel at the desired temperature and pressure. Under the pressure the tubes collapse producing an equivalent pressure internally. After polymerization each tube was weighed and the weight compared with the prereaction weight in order to detect leaks which may have occurred during the pressure run. The label was then removed from the tube and the outside of the tube was rinsed with acetone and methylene chloride A small portion of the tube was removed with the scissors. The tube was opened inside a beaker or flask in case the contents spurted out due to sudden release of internal pressure. The contents were removed by successive rinses of the tube with methylene chloride. The number of rinses depended on the viscosity of the product. The tube was then opened lengthwise to ensure that no material was left inside and that the inside of the tube was not charred. The solvent was then removed under vacuum. The residue was dissolved in methylene chloride and poured into methanol to precipitate the polymer in the case of methyl methacrylate. For ethyl acrylate runs, the polymer can be isolated by simply evaporating the solvents and drying the residue at 50° in vacuo. The crude polymer was analyzed by $^1$H NMR spectroscopy and gel permeation chromatography.

EXAMPLE 1

Uncatalyzed Polymerization of Methyl Methacrylate

A stainless steel pressure reactor was charged with a solution of 1.38 g (5 mmol) of $(CH_3)_2C=C(OCH_2CH_2OSi(CH_3)_3)OSi(CH_3)_3$, 25 g (250 mmol) of methyl methacrylate and 75 mL of acetonitrile under an argon atmosphere. The reactor was closed, cooled to $-45°$ and evacuated. The reactor was pressured to 1000 atm (101 MPa) with argon gas at 22°. The reactor was heated and pressurization was continued until the desired values of 50° and 3000 atm (304 MPa) were obtained. The system was agitated by gentle shaking for 24 hours while being maintained at 3000 atm (304 MPa) and 50°. After cooling to 22°, the pressure was released and the contents poured into a 250 mL round-bottom flask. Evaporation and drying gave a polymer whose $^1$H NMR was consistent with the structure (δ ppm, CDCl$_3$): 0.013 ([CH$_3$]$_3$Si), 0.89 (syndiotactic CH$_3$), 0.98 (heterotactic CH$_3$), 1.95 (CH$_2$, broad), 3.61 (CH$_3$O), 3.91 (OCH$_2$CH$_2$O). The polymer is highly syndiotactic (ca. 70%), having $T_g$ +123.1°. $M_n$ (GPC) 249,000, $M_w$ (GPC) 999,000.

EXAMPLE 2

Uncatalyzed Polymerization of Methyl Methacrylate

The procedure of Example 1 was substantially repeated except that a glass lined stainless steel vessel was charged with 15 g of methyl methacrylate, 0.36 g of $(CH_3)_2C=C(OCH_3)OSi(CH_3)_3$ as initiator and 48 ml of tetrahydrofuran. The reaction was conducted at 50° and 1000 atm (101 MPa) for 18 hours. Precipitation from methanol gave 0.44 g of polymer. The $^1$H NMR spectrum showed a distinct (CH$_3$)$_3$Si peak at 0° and was consistent with the expected structure.

EXAMPLE 3

Uncatalyzed Polymerization of Ethyl Acrylate

A platinum tube was charged with 4.62 g (46 mmol) of ethyl acrylate and 0.19 mL (0.93 mmol) of $(CH_3)_2C=C(OCH_3)OSi(CH_3)_3$ as initiator. The tube was subjected to 1000 atm (101 MPa) of argon gas pressure at 50° for 14 hours in a stainless steel pressure vessel. The resulting polymer product was worked up to give 4.78 g (100%) of poly(ethyl acrylate).

EXAMPLE 4

Uncatalyzed Copolymerization of Methyl Metracrylate and Ethyl Acrylate

A platinum tube was charged with 0.75 g (7.4 mmol) of methyl methacrylate, 0.75 g (7.4 mmol) of ethyl acrylate, 0.012 mL (0.06 mmol) of $(CH_3)_2C=C(OCH_3)OSi(CH_3)_3$ as initiator and 3.30 mL of acetonitrile. The tube was subjected to 1000 atm (101 MPa) of argon pressure at 50° for 36 hours in a stainless steel reactor. Work-up of the reaction mixture gave 0.55 g of polymer identified by $^1$H nuclear magnetic resonance spectroscopy to be poly(methyl methacrylate-co-ethyl acrylate). Gel permeation chromatography gave $M_n$ 1,068,000, $M_w$ 2,256,000 and $M_w/M_n$ 2.11.

EXAMPLE 5

A. Uncatalyzed Polymerization of Ethyl Acrylate

A platinum tube was charged with 3.05 g (30.5 mmol) of ethyl acrylate, 0.08 mL (0.40 mmol) of $(CH_3)_2C=C(OCH_3)OSi(CH_3)_3$ as initiator and 6.60 mL of tetrahydrofuran. The tube was subjected to 1000 atm (101 MPa) of argon pressure at 50° for 14 hours. A 3 ml aliquot of the final reaction mixture was removed to be used in the second part of this Example and the rest worked up normally to give 84% yield of poly(ethyl acrylate). $M_n$ 6870, $M_w$ 33,300, $M_w/M_n$ 4.85.

B. Uncatalyzed Polymerization of Methyl Methacrylate Using Polymer from Section A as Initiator A platinum tube was charged with a 3 mL aliquot from Section A of this Example, 1.87 g (18.7 mmol) of methyl methacrylate and 5.0 mL of dichloromethane. The tube was subjected to 1000 atm (101 MPa) of argon pressure at 50° for 14 hours. Work-up of the reaction mixture gave a polymer identified by $^1$H NMR spectroscopy to be poly(ethyl acrylate-co-methyl methacrylate) block copolymer. Since no additional initiator was used in the second part, it followed that poly(ethyl acrylate) produced from section A of this Example was living and hence capable of initiating a new chain. Calculations based upon the total amount of methyl methacrylate added gave 91% conversion of methyl methacrylate. $M_n$ 17,700, $M_w$ 35,600, $M_w/M_n$ 2.01.

EXAMPLE 6

A. Uncatalyzed Polymerization of Ethyl Acrylate

A platinum tube was charged with 2.31 g (23.1 mmol) of ethyl acrylate, 0.092 mL (0.46 mol) of $(CH_3)_2C=C(OCH_3)OSi(CH_3)_3$ as initiator and 7.50 mL of tetrahydrofuran. The tube was subjected to 1000 atm (101 MPa) of argon pressure at 50° for 14 hours. The reaction produced a 63% yield of polymer with $M_n$ 11,400, $M_w$ 31,200 and $M_w/M_n$ 2.75.

B. Uncatalyzed Polymerization of Ethyl Acrylate Using Polymer from Section A as Initiator A platinum tube was charged with a 3 mL aliquot of the polymer from section A of this Example and 0.69 g (6.93 mmol) of ethyl acrylate. The tube was subjected to 1000 atm (101 MPa) of argon pressure at 50° for 14 hours. The resulting polymer was worked-up to give a 76% yield of polymer with $M_n$ 12,200, $M_w$ 27,800 and $M_w/M_n$ 2.29.

EXAMPLE 7

Uncatalyzed Polymerization of Acrylonitrile

A platinum tube was charged with 7.0 mL of dimethylformamide, 3 mL of acrylonitrile and 0.091 mL (0.46 mmol) of $(CH_3)_2C=C(OCH_3)OSi(CH_3)_3$ as initiator. The tube was subjected to 1000 atm (101 MPa) of pressure at 75° for 14 hours to give a 100% yield of polyacrylonitrile.

EXAMPLE 8

Uncatalyzed Polymerization of Ethyl Acrylate

A platinum tube was charged with 3.05 g (30.50 mmol) of ethyl acrylate, 0.08 mL (0.27 mmol) of $(CH_3)_2C=C(OCH_2CH_2OSi(CH_3)_3)OSi(CH_3)_3$ and 6.60 mL of tetrahydrofuran. The tube was subjected to 1000 atm (101 MPa) of argon pressure for 14 hours. Work-up gave a 65% yield of the desired polymer with $M_n$ 19,600, $M_w$ 46,100, $M_w/M_n$ 2.35.

EXAMPLES 9–28

Uncatalyzed Polymerizations

Platinum tubes were charged with the amounts of monomer, $(CH_3)_2C=C(OCH_3)OSi(CH_3)_3$ as initiator and solvent and were subjected to the pressures of argon gas shown in Table I. All of the Examples, except for Examples 17, 18, and 19 were conducted for 14 hours at 50°. Examples 17, 18 and 19 were conducted for 36 hours. The results are shown in Table I.

TABLE 1

| Example / Mw | Monomer / Mw/Mn | Solvent | Initiator (µL) | Pressure (MPa) | Polymer Yield | Mn |
|---|---|---|---|---|---|---|
| 9 | 1.75 mL MMA | 4.20 mL MeCN | 67 | 101 | 4% | 1,116,000 |
| 3,093,000 | 2.77 | | | | | |
| 10 | 1.75 mL MMA | 4.20 mL THF | 67 | 101 | 20% | 392,000 |
| 1,830,000 | 4.66 | | | | | |
| 11 | 1.63 mL EA | 3.26 mL MeCN | 60 | 101 | 16% | 1,186,000 |
| 2,823,000 | 2.38 | | | | | |
| 12 | 1.63 mL EA | 3.26 mL THF | 60 | 101 | 73% | 14,200 |
| 43,900 | 3.09 | | | | | |
| 13 | 3.56 mL EA | 1.84 mL THF | 130 | 101 | 52% | 71,900 |
| 229,000 | 3.19 | | | | | |
| 14 | 1.60 mL MMA | 3.30 mL THF | 40 | 101 | 08% | 2,578,000 |
| 6,664,000 | 3.88 | | | | | |
| 15 | 1.63 mL EA | 3.30 mL THF | 120 | 101 | 56% | 20,400 |
| 48,900 | 2.40 | | | | | |
| 16 | 1.63 mL EA | 3.30 mL THF | 40 | 101 | 92% | 12,400 |
| 39,700 | 3.19 | | | | | |
| 17 | 1.60 mL MMA | 3.30 mL MeCN | 60 | 101 | 58% | 1,088,000 |
| 1,871,000 | 1.72 | | | | | |
| 18 | 1.63 mL EA | 3.30 mL MeCN | 60 | 101 | 65% | 1,020,000 |
| 2,134,000 | 2.09 | | | | | |
| 19 | 1.63 mL EA | 3.30 mL THF | 60 | 101 | 84% | 21,400 |
| 45,100 | 2.11 | | | | | |
| 20 | 1.60 mL MMA | 3.30 mL THF | 60 | 303 | 58% | 603,000 |
| 1,547,000 | 2.57 | | | | | |
| 21 | 1.60 mL MMA | 3.30 mL MeCl | 60 | 303 | 88% | 1,180,000 |
| 2,039,000 | 1.73 | | | | | |
| 22 | 1.63 mL EA | 3.30 mL THF | 60 | 303 | 83% | 26,500 |
| 62,800 | | | | | | |
| 23 | 1.00 mL EA | 9.00 mL THF | 36 | 101 | 43% | 5,170 |
| 11,600 | 2.24 | | | | | |
| 24 | 1.60 mL MMA | 3.30 mL THF | 120 | 101 | 23% | 468,000 |
| 1,600,000 | 3.42 | | | | | |
| 25 | 2.50 mL EA | 7.50 mL THF | 92 | 101 | 63% | 11,400 |
| 31,200 | 2.75 | | | | | |
| 26 | 1.00 mL EA | 9.00 mL THF | 36 | 101 | 55% | 4,920 |
| 10,700 | 2.18 | | | | | |
| 27 | 2.50 mL EA | 7.50 mL MeCl | 92 | 101 | 33% | 984,000 |
| 2,168,000 | 2.20 | | | | | |
| 28 | 3.00 mL EA | 7.00 mL THF | 55 | 101 | 100% | 10,500 |
| 30,400 | 2.90 | | | | | |

MMA = methyl methacrylate
EA = ethyl acrylate
MeCN = acetonitrile
THF = tetrahydrofuran
MeCl = methylene chloride

COMPARATIVE EXPERIMENTS 1-28

For each of the Examples 1-28, a corresponding comparative experiment was performed. The controls were run under identical conditions without the use of an initiator. In all cases the control runs gave no polymer, demonstrating that the initiation is by the silyl ketene acetals.

What is claimed is:

1. Polymerization process for preparing a "living" polymer, said process comprising contacting at least one polar acrylic or maleimide monomer with a tetracoordinate organosilicon polymerization initiator having at least one initiating site in the absence of a co-catalyst and at a pressure greater than about 50 MPa, wherein the initiator is of the formula $(Q')_3MZ^1$, $(Q')_2M(Z^1)_2$ $(Z^1(Q')_2M)_2O$ or $(Q')_3MZ^2$ wherein:

each Q', independently, is selected from $R^1$, $OR^1$, $SR^1$ and $N(R^1)_2$

M is Si;

$Z^1$ is

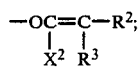

$Z^2$ is —CN or —NC;

$X^2$ is $-OSi(R^1{}_1)$, $-R^6$, $-OR^6$ or $-NR'R''$;

$R^6$ is (a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one of more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more initiating sites;

each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H;

each of $R^2$ and $R^3$ is independently selected from —H and hydrocarbyl, defined as for $R^6$ above, subparagraphs (a) to (e); and each of R' and R'' is independently selected from $C_{1-4}$ alkyl.

2. Process of claim 1 wherein the pressure is from about 100 MPa to about 500 MPa.

3. Process of claim 2 wherein the pressure is from about 250 MPa to about 350 MPa.

4. Process of claim 3 wherein the process is conducted at a temperature of from about 25° C. to about 110° C.

5. Process of claim 1 wherein the monomer is a polar acrylic monomer selected from the group consisting of $CH_2=C(Y)X$ wherein:

X is —CN, —CH=CHC(O)X' or —C(O)X';

Y is —H, —CH_3, —CN or —CO_2R, provided, however, when X is —CH=CHC(O)X', Y is —H or —CH_3;

X' is $-OSi(R^1)_3$, —R, —OR or —NR'R'';

each $R^1$, independently, is a hydrocarbyl radical which is an aliphatic, alicyclic, aromatic or mixed aliphatic-aromatic radical containing up to 20 carbon atoms or —H, provided that at least one $R^1$ group is not —H;

R is:

(a) a hydrocarbyl radical which is an aliphatic, alicyclic, aromatic or mixed aliphatic-aromatic radical containing up to 20 carbon atoms;

(b) a polymeric radical containing at least 20 carbon atoms;

(c) a radical of (a) or (b) containing one or more ether oxygen atoms within aliphatic segments thereof;

(d) a radical of (a), (b) or (c) containing one or more functional substituents that are unreactive under polymerizing conditions; or (e) a radical of (a), (b), (c) or (d) containing one or more reactive substituents of the formula $-Z'(O)C-C(Y^1)=CH_2$ wherein $Y^1$ is —H or —CH_3 and Z' is O or NR'; and each of R' and R'' is independently selected from $C_{1-4}$ alkyl.

6. Process of claim 5, wherein R is a radical containing one or more reactive substituents of the formula $-Z'(O)C-C(Y^1)=CH_2$ wherein $Y^1$ is —H or —CH_3, Z' is O or NR', and R' is selected from $C_{1-4}$ alkyl.

7. Process of claim 5 wherein the pressure is from about 100 MPa to about 500 MPa.

8. Process of claim 7 wherein the pressure is from about 250 MPa to about 350 MPa.

9. Process of claim 8 wherein the process is conducted at a temperature of from about 25° C. to about 110° C.

10. Process of claim 5, wherein the initiator is a tetracoordinate organosilicon polymerization initiator having more than one initiating site.

11. Process of claim 5, wherein the initiator is at least one selected from the group consisting of [(1-methoxy-2-methyl-1-propenyl)oxy]trimethylsilane; [(2-methyl-1-propenylidene)bis(oxy)bis[trimethylsilane]; and [(2-methyl-1-[2-(trimethylsiloxy)ethoxy]-1-propenyl)oxy]-trimethylsilane.

12. Process of claim 10, wherein the initiator is at least one selected from the group consisting of trimethyl a,a'a''-tris(trimethylsilyl)-1,3,5-benzenetriacetate, dimethyl a,a'-bis(trimethylsilyl)-1,3-benzenediacetate, 1,6-dimethoxy-1,5-hexadiene-1,6-diylbis(oxy)bis[trimethylsilane], and bis[(1-methoxy-2-methyl-1-propenyl)oxy]methylsilane.

13. Process of claim 5, wherein $X^2$ is $-OR^6$ and $R^6$ is —CH_3; Q' is $-OR^1$ or $-N(R^1)_2$; $R^1$ is —CH_3 or —C_2H_5; and $R^2$ and $R^3$ are, independently, —H or —CH_3.

14. Process of claim 10 wherein the pressure is from about 100 MPa to about 500 MPa.

15. Process of claim 14 wherein the pressure is from about 250 MPa to about 350 MPa.

16. Process of claim 15 wherein the process is conducted at a temperature of from about 25° C. to about 110° C.

17. Process of preparing a block polymer from the "living polymer" produced by the process of claim 1 by the addition of monomers active in "Group Transfer Polymerization" to said "living polymer" of claim 1.

18. Process comprising quenching of the "living" polymer prepared by the process of claim 1 with an active hydrogen source.

* * * * *